United States Patent
Bhatia et al.

(10) Patent No.: US 8,146,350 B2
(45) Date of Patent: Apr. 3, 2012

(54) VARIABLE POWER DISTRIBUTION FOR ZONED REGENERATION OF AN ELECTRICALLY HEATED PARTICULATE FILTER

(75) Inventors: Garima Bhatia, Bangalore (IN);
Eugene V. Gonze, Pinckney, MI (US);
Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 889 days.

(21) Appl. No.: 12/146,827

(22) Filed: Jun. 26, 2008

(65) Prior Publication Data

US 2009/0113883 A1   May 7, 2009

Related U.S. Application Data

(60) Provisional application No. 60/977,539, filed on Oct. 4, 2007.

(51) Int. Cl.
*F01N 3/027* (2006.01)
(52) U.S. Cl. .................. 60/295; 60/303; 60/311
(58) Field of Classification Search .......... 60/286, 60/295, 303, 311
See application file for complete search history.

(56) References Cited

U.S. PATENT DOCUMENTS

| | | | |
|---|---|---|---|
| 4,505,726 A | | 3/1985 | Takeuchi |
| 4,516,993 A | * | 5/1985 | Takeuchi et al. ............... 55/283 |
| 4,872,889 A | | 10/1989 | Lepperhoff et al. |
| 5,144,798 A | * | 9/1992 | Kojima et al. .................. 60/303 |
| 5,972,075 A | * | 10/1999 | Fukuda et al. .................... 95/15 |
| 6,167,696 B1 | * | 1/2001 | Maaseidvaag et al. ......... 60/274 |
| 2003/0037674 A1 | * | 2/2003 | Allie et al. ....................... 95/278 |

FOREIGN PATENT DOCUMENTS

| | | |
|---|---|---|
| DE | 3712333 A1 | 10/1988 |
| DE | 4243990 A1 | 7/1994 |
| DE | 10151425 A1 | 4/2003 |

* cited by examiner

*Primary Examiner* — Thomas Denion
*Assistant Examiner* — Jonathan Matthias (57) ABSTRACT

A system includes a particulate matter (PM) filter with multiple zones, an electric heater and a control module. The electrical heater includes heater segments, which each correspond with a respective one of the zones. The electrical heater is arranged upstream from and is proximate with the PM filter. The control module selectively applies a first energy level to a first one of the zones via a first one of the heater segments to initiate regeneration in the first zone. The control module also selectively applies a second energy level that is less than the first energy level to a second one of the zones via a second one of the heater segments to initiate regeneration in the second zone.

23 Claims, 9 Drawing Sheets

VARIABLE POWER DISTRIBUTION FOR ZONED REGENERATION OF AN ELECTRICALLY HEATED PARTICULATE FILTER

CROSS-REFERENCE TO RELATED APPLICATIONS

This application claims the benefit of U.S. Provisional Patent Application No. 60/977,539, filed on Oct. 4, 2007. The disclosure of the above application is incorporated herein by reference in its entirety.

STATEMENT OF GOVERNMENT RIGHTS

This disclosure was produced pursuant to U.S. Government Contract No. DE-FC-04-03 AL67635 with the Department of Energy (DoE). The U.S. Government has certain rights in this disclosure.

FIELD

The present disclosure relates to particulate matter (PM) filters, and more particularly to power management of electrically-heated PM filters.

BACKGROUND

The statements in this section merely provide background information related to the present disclosure and may not constitute prior art.

Engines such as diesel engines produce particulate matter (PM) that is filtered from exhaust gas by a PM filter. The PM filter is disposed in an exhaust system of the engine. The PM filter reduces emission of PM that is generated during combustion.

Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/or using microwave energy. The resistive heating coils are typically arranged in contact with the PM filter to allow heating by both conduction and convection.

Diesel PM combusts when temperatures above a combustion temperature such as 600° C. are attained. The start of combustion causes a further increase in temperature. While spark-ignited engines typically have low oxygen levels in the exhaust gas stream, diesel engines have significantly higher oxygen levels. While the increased oxygen levels make fast regeneration of the PM filter possible, it may also pose some problems.

PM reduction systems that use fuel tend to decrease fuel economy. For example, many fuel-based PM reduction systems decrease fuel economy by 5%. Electrically heated PM reduction systems reduce fuel economy by a negligible amount. However, durability of the electrically heated PM reduction systems has been difficult to achieve. Also, power to electrically heat the PM can be significant.

SUMMARY

In one example embodiment, a system is provided that includes a particulate matter (PM) filter with multiple zones, an electric heater and a control module. The electrical heater includes heater segments, which each correspond with a respective one of the zones. The electrical heater is arranged upstream from and is proximate with the PM filter. The control module selectively applies a first energy level to a first one of the zones via a first one of the heater segments to initiate regeneration in the first zone. The control module also selectively applies a second energy level that is less than the first energy level to a second one of the zones via a second one of the heater segments to initiate regeneration in the second zone.

In other features, a method is provided that includes providing a particulate matter (PM) filter with zones. An electrical heater that includes heater segments, which each correspond with a respective one of the zones, is arranged upstream from and proximate with the PM filter. A first energy level is selectively applied to a first one of the zones via a first one of the heater segments to initiate regeneration in the first zone. A second energy level that is less than the first energy level is selectively applied to a second one of the zones via a second one of the heater segments to initiate regeneration in the second zone.

In still other features, a system is provided that includes a particulate matter (PM) filter with zones, an electric heater and a control module. The electrical heater includes heater segments, which each correspond with a respective one of the zones. The electrical heater is arranged upstream from and proximate with the PM filter. A control module regenerates the zones by selectively applying a different energy level to each of the zones.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure increases input exhaust temperature before performing regeneration using an electrical heater to enable more robust PM filter regeneration. For example only, the inlet exhaust temperature may be raised above maximum exhaust gas temperature at the PM filter encountered during normal operation and less than a soot oxidation temperature. The temperature of the exhaust gas entering an inlet of the PM filter may be increased by modifying engine management, using a fuel burner, using a catalytic oxidizer to increase the exhaust temperature with after injection of fuel, and/or other suitable approaches.

For example only, the exhaust temperature may be raised to a temperature range between 340 to 540 degrees Celsius. This temperature range is lower than typical soot oxidation temperature but higher than the natural exhaust temperature. Typically, high efficiency engines operate cooler than about 300 degrees Celsius.

Once the exhaust gas temperature to the PM filter is raised, the electrical heater activates heated zones, which causes a soot combustion wave to travel down the PM filter channel to clean the filter. This process continues until all of the heater zones are regenerated. When PM filter regeneration is run with an inlet exhaust temperature in this increased temperature range described herein, the combustion flamefronts are less likely to be extinguished. The increased inlet exhaust temperature also creates a smaller temperature delta, which reduces thermal stress forces on the PM filter.

The electrical heater can be zoned or unzoned. The electrical heater may be in contact with or spaced from the PM filter. The heater selectively heats all or portions of the PM filter. The PM filter may be in contact with or mounted close enough to the front of the PM filter to control the heating pattern. The length of the heater may be set to optimize the exhaust gas temperature.

Thermal energy is transmitted from the electric heater to the PM filter. The PM filter may be heated by convection and/or conduction. The electrical heater may be divided in zones to reduce electrical power required to heat the PM filter. The zones also heat selected downstream portions within the PM filter. By heating only the selected portions of the filter, the magnitude of forces in the substrate is reduced due to thermal expansion. As a result, higher localized soot temperatures may be used during regeneration without damaging the PM filter.

The PM filter may be regenerated by selectively heating one or more of the zones in the front of the PM filter and igniting the soot using the heated exhaust gas. When a sufficient face temperature is reached, the heater may be turned off and the burning soot then cascades down the length of the PM filter channel, which is similar to a burning fuse on a firework. The burning soot is the fuel that continues the regeneration. This process is continued for each heating zone until the PM filter is completely regenerated.

The heater zones may be spaced in a manner such that thermal stress is mitigated between active heaters. Therefore, the overall stress forces due to heating are smaller and distributed over the volume of the entire electrically heated PM filter. This approach allows regeneration in larger segments of the electrically heated PM filter without creating thermal stresses that damage the electrically heated PM filter.

A largest temperature gradient tends to occur at edges of the zoned heaters. Therefore, activating one heater past the localized stress zone of another heater enables more actively heated regeneration volume without an increase in overall stress. This tends to improve the regeneration opportunity within a drive cycle and reduces cost and complexity since the system does not need to regenerate as many zones independently.

Figure 1:
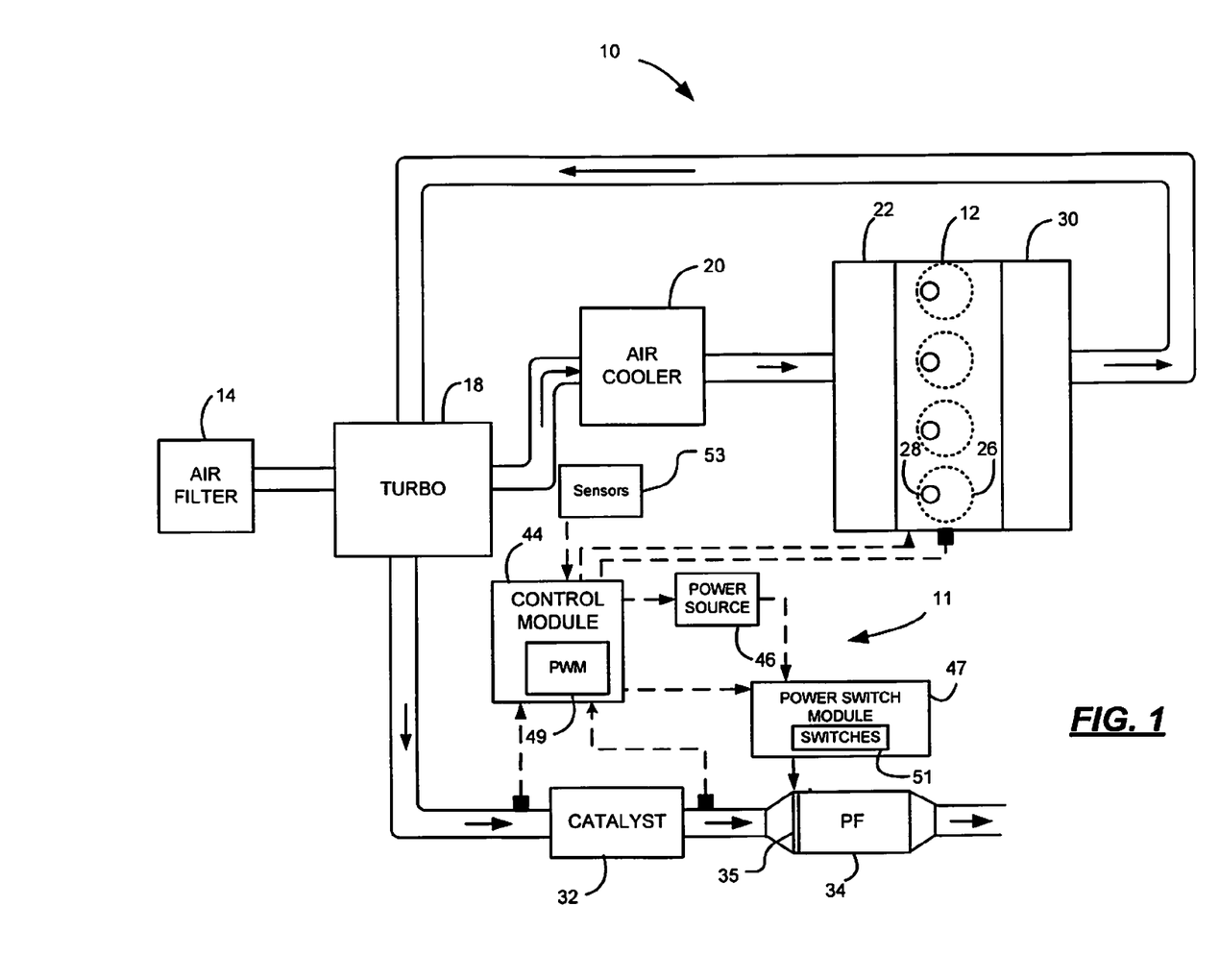
FIG. 1 is a functional block diagram of an exemplary engine system incorporating a power distribution system for an electrically heated particulate matter (PM) filter.

Referring now to FIG. 1, an exemplary diesel engine system 10 is schematically illustrated in accordance with the present disclosure. It is appreciated that the diesel engine system 10 is merely exemplary in nature and that the zone heated particulate filter regeneration system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

Figure 4:
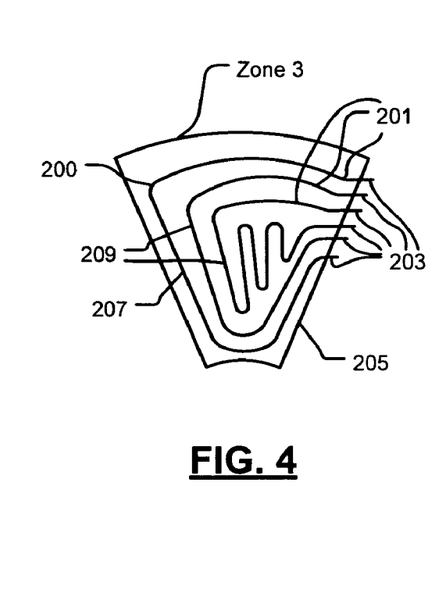
FIG. 4 illustrates an exemplary resistive heater in one of the zones of the zoned inlet heater of FIG. 3.

The engine system 10 includes a power distribution system 11 that manages power to an electric heater 35. The power distribution system 11 includes a control module 44, a power source 46, a power switch module 47 and the electric heater 35, which has heater segments that are associated with zones of a particulate matter (PM) filter 34. Example heater segments are shown in FIG. 4. The control module 44 includes a pulse width modulation (PWM) module 49 that controls energy including power and duration of applied power to the heater segments. The power switch module 47 may be a power distribution box that includes relays and/or switches 51, which are associated with the heater segments. The control module 44 provides control signals to the switches 51 to allow power from the power source 46 to be transferred to the selected heater segments.

A turbocharged diesel engine system 10 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 10. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a V-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PM filter) assembly 34 with an inlet heater 35. The heater 35 may be zoned. Optionally, an EGR valve (not shown) recirculates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32, through the heater 35 and into the PM filter assembly 34. The DOC 32 oxidizes the exhaust based on the post combustion air/fuel ratio. The amount of oxidation increases the temperature of the exhaust. The PM filter assembly 34 receives exhaust from the DOC 32 and filters any soot particulates present in the exhaust. The inlet heater 35 is in contact with or spaced from the PM filter assembly 34 and heats the exhaust to a regeneration temperature as will be described below.

A control module 44 controls the engine and PM filter regeneration based on various sensed and/or estimated information. The sensed information may come from the sensors 53 or may be estimated based on sensed information and operating state of the engine system 10.

The sensors may include temperature sensors, engine sensors and modules, air-related sensors, and pressure sensors. The sensors may include sensors for determining exhaust flow levels, exhaust temperature levels, exhaust pressure levels, oxygen levels, intake air flow rates, intake air pressure, intake air temperature, engine speed, EGR, etc.

The temperature sensors may include an intake temperature sensor, an engine coolant temperature sensor, an engine oil temperature sensor, exhaust gas temperature sensors, PM filter temperature sensors, an ambient temperature sensor, and may include other engine temperature sensors. The intake air temperature sensor may generate an intake air temperature (IAT) signal. The engine coolant temperature sensor may generate an engine coolant temperature (ECT) signal. The engine oil temperature sensor may generate an engine oil temperature ($T_{OIL}$) signal. The exhaust gas temperature sensors may generate inlet, internal and outlet exhaust temperature signals associated with a PM filter. The ambient temperature sensor may generate an ambient temperature (AMB) signal.

The engine sensors and modules may include a cylinder air evaluation module, an engine output torque sensor or module, an engine load module, an engine runtime indicator, an engine speed sensor. The cylinder air evaluation module determines status of air within cylinders of an engine. The status may include, for example, flow rate and cylinder air mass. The cylinder air evaluation module determines the status based on air-related signals generated by the air sensors and engine output torque. The engine output torque may be directly or indirectly measured or estimated. The engine output torque may be directly measure via one or more sensors, such as a drive shaft torque sensor, a strain gauge, or other torque sensor. The engine output torque may be indirectly estimated based on engine operating parameters some of which are disclosed herein, for example, using a look-up table. The engine speed sensor, such as a camshaft, crankshaft, flywheel or transmission sensor, generates speed signal that is indicative of engine speed RPM. The control module can determined engine speed from the speed signal. Note that the engine speed may also be indirectly estimated based on engine operating parameters.

The air sensors may include an air flow sensor, a throttle position sensor, an intake air pressure sensor, and may include other air-related sensors. An air flow sensor may be a mass air flow (MAF) sensor that monitors the air flow rate through a throttle. The throttle position sensor is responsive to a position of a throttle plate and generates a throttle position signal TPS. The intake air pressure sensor generates a manifold absolute pressure (MAP) signal.

The pressure sensors may be responsive to atmospheric pressure and may generate a barometric pressure BARO signal.

More specifically, the control module 44 estimates loading of the PM filter assembly 34 based on the sensed and estimated information. When the estimated loading is at a predetermined level and the exhaust flow rate is within a desired range, current may be controlled to the PM filter assembly 34 via a power source 46 to initiate the regeneration process. The duration of the regeneration process may be varied based upon the estimated amount of particulate matter within the PM filter assembly 34.

Current is applied to the heater 35 during the regeneration process. More specifically, the energy may heat selected zones of the heater 35 of the PM filter assembly 34 for predetermined periods, respectively. Exhaust gas passing through the heater 35 is heated by the activated zones. The heated exhaust gas travels to the downstream filter of PM filter assembly 34 and heats the filter by convection and/or conduction. The remainder of the regeneration process may be achieved using the heat generated by the heated exhaust passing through the PM filter.

Figure 2:
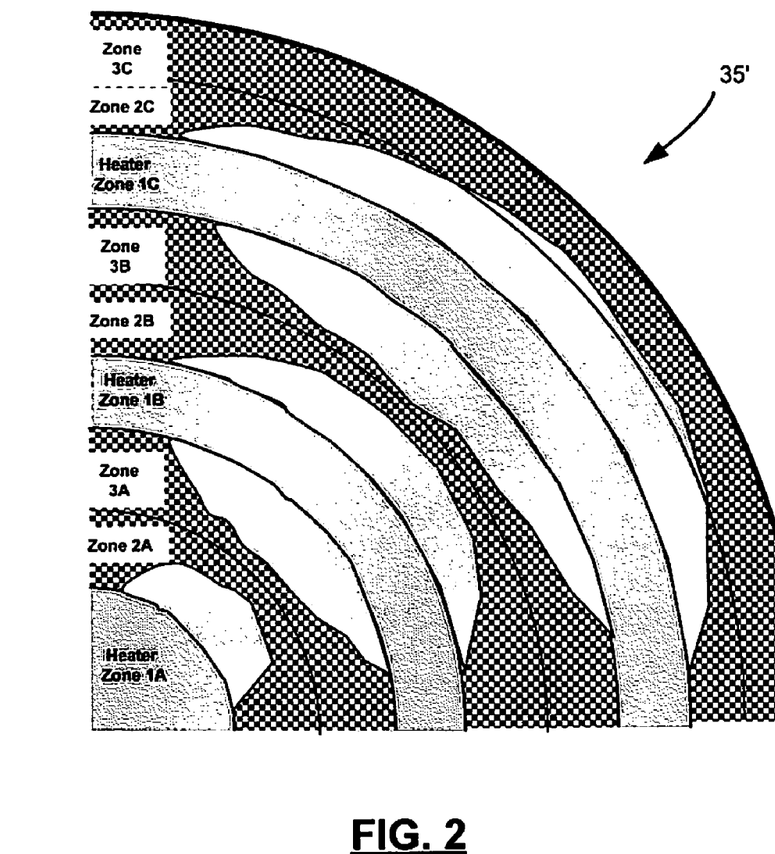
FIG. 2 illustrates exemplary zoning of a zoned inlet heater for the electrically heated PM filter of FIG. 1.

Referring now to FIG. 2, an exemplary zoned inlet heater 35' for the PM filter assembly 34 is shown. The electrically heated PM filter assembly 34 is arranged spaced from or in contact with the PM filter assembly 34. The PM filter assembly 34 includes multiple spaced heater zones including zone 1 (with sub-zones 1A, 1B and 1C), zone 2 (with sub-zones 2A, 2B and 2C) and zone 3 (with sub-zones 3A, 3B and 3C). The zones 1, 2 and 3 may be activated during different respective periods.

As exhaust gas flows through the activated zones of the heater, regeneration occurs in the corresponding portions of the PM filter that initially received the heated exhaust gas (e.g. areas downstream from the activated zones) or downstream areas that are ignited by cascading burning soot. The corresponding portions of the PM filter that are not downstream from an activated zone act as stress mitigation zones. For example in FIG. 2, sub-zones 1A, 1B and 1C are activated and sub-zones 2A, 2B, 2C, 3A, 3B, and 3C act as stress mitigation zones.

The corresponding portions of the PM filter downstream from the active heater sub-zones 1A, 1B and 1C thermally expand and contract during heating and cooling. The stress mitigation sub-zones 2A and 3A, 2B and 3B, and 2C and 3C mitigate stress caused by the expansion and contraction of the heater sub-zones 1A, 1B and 1C. After zone 1 has completed regeneration, zone 2 can be activated and zones 1 and 3 act as stress mitigation zones. After zone 2 has completed regeneration, zone 3 can be activated and zones 1 and 2 act as stress mitigation zones.

Figure 3:
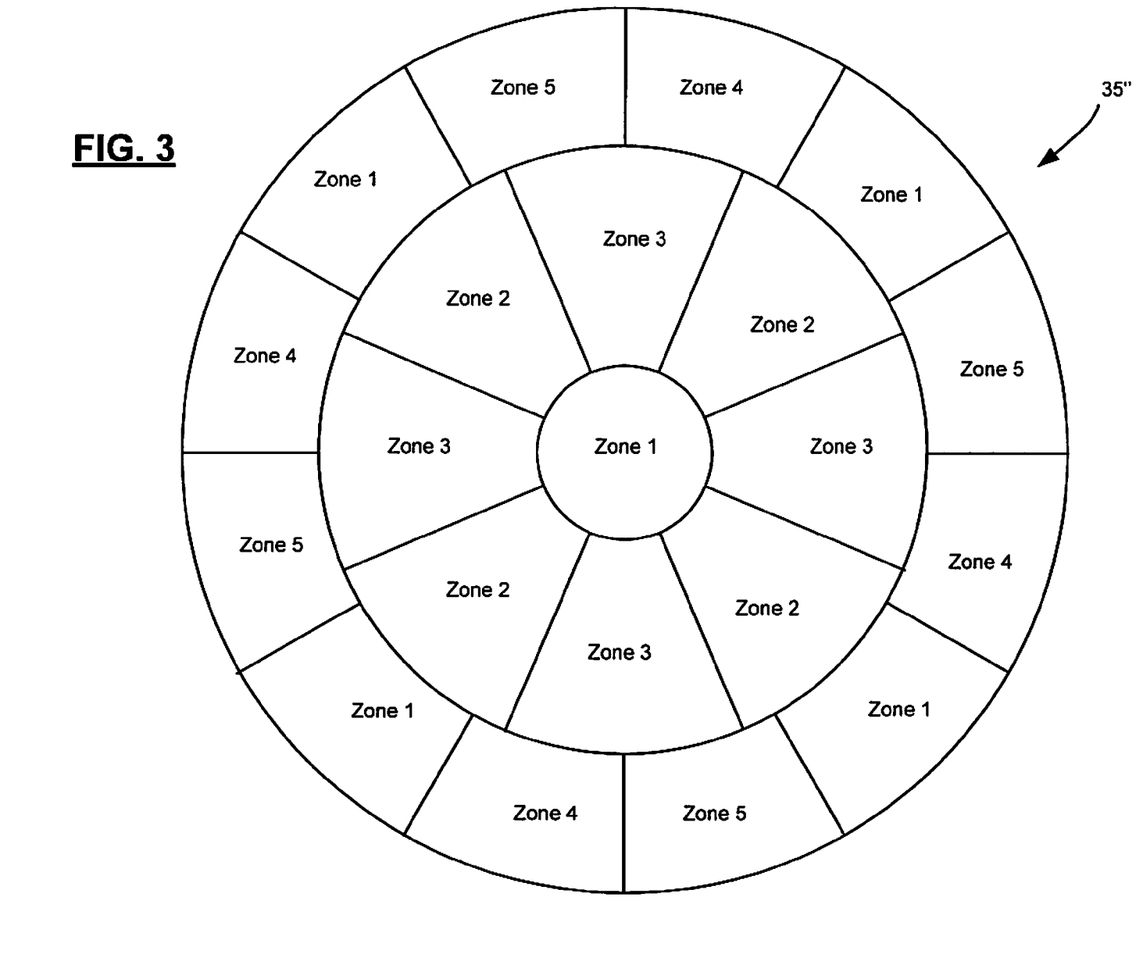
FIG. 3 illustrates exemplary zoning of a zoned inlet heater for the electrically heated PM filter of FIG. 1.

Referring now to FIG. 3, another exemplary zoned inlet heater 35" is shown. A center portion may be surrounded by a middle zone including a first circumferential band of zones. The middle portion may be surrounded by an outer portion including a second circumferential band of zones.

In this example, the center portion includes zone 1. The first circumferential band of zones includes zones 2 and 3. The second circumferential band of zones comprises zones 1, 4 and 5. As with the embodiment described above, downstream portions from active zones are regenerated while downstream portions from inactive zones provide stress mitigation. As can be appreciated, one of the zones 1, 2, 3, 4 and 5 can be activated at a time. Others of the zones remain inactivated.

Referring now to FIG. 4, an exemplary resistive heater 200 arranged adjacent to one of the zones (e.g. zone 3) from the first circumferential band of zones in FIG. 3 is shown. The resistive heater 200 may comprise one or more coils, heater segments, or conductive elements that cover the respective zone to provide sufficient heating. The resistive heater 200, as shown, includes three (3) heater segments 201, which are electrically conductive. The heater segments 201 include ends 203 that extend over a peripheral edge 205 of the zone 3.

The heater segments include an outer heater segment 207 and two inner heater segments 209. The outer heater segment 207 extends around the inner heater segments 209.

Figure 5:
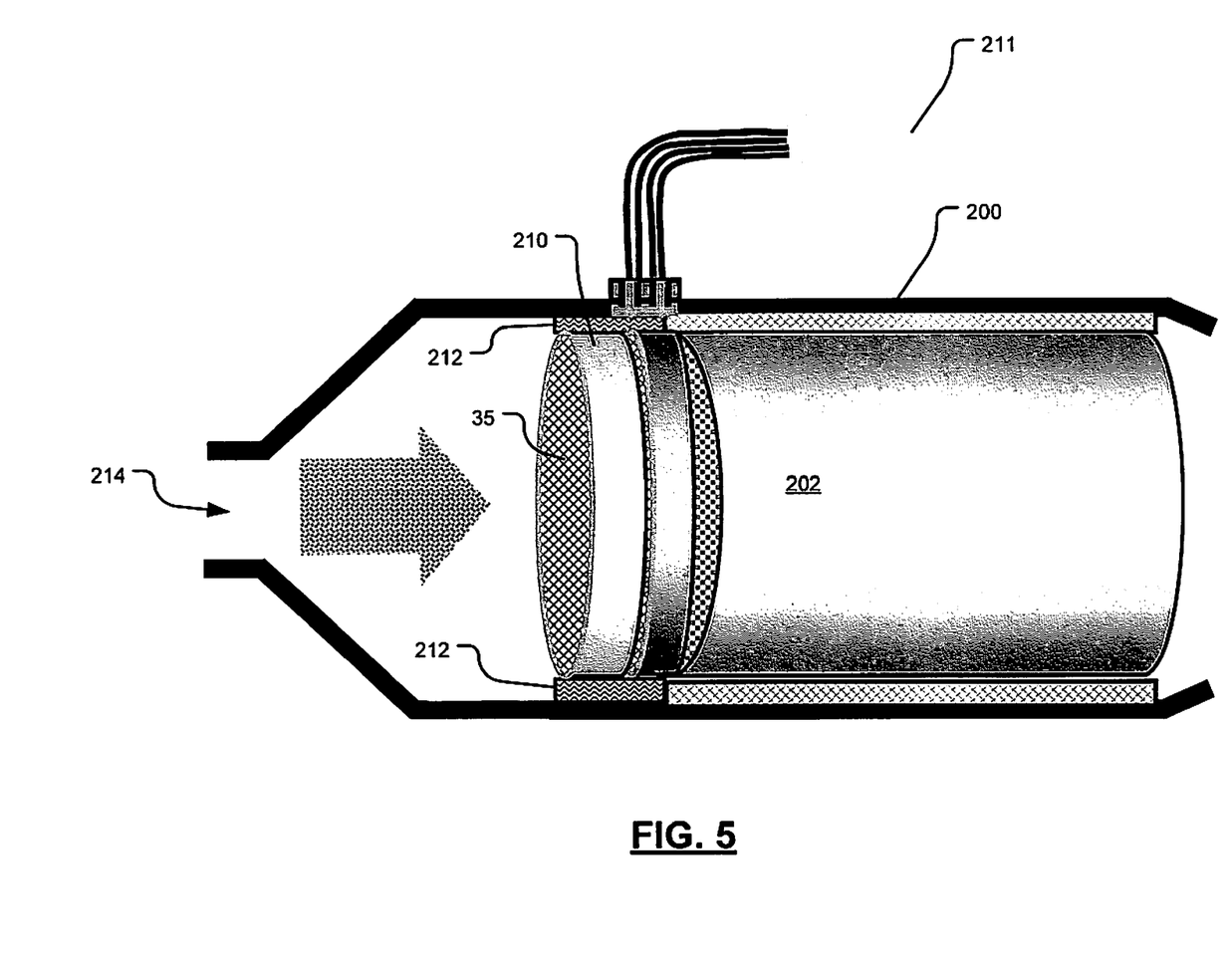
FIG. 5 illustrates the electrically heated PM filter of FIG. 1 having a zoned electric heater.

Referring now to FIG. 5, the PM filter assembly 34 is shown in further detail. The PM filter assembly 34 includes a housing 200, a filter 202, and the zoned heater 35. The filter 202 may include a rear endplug 208. The heater 35 may be arranged between a laminar flow element 210 and a substrate of the filter 202. An electrical connector 211 may provide current to the zones of the PM filter assembly 34 as described above.

As can be appreciated, the heater 35 may be in contact with or spaced from the filter 202 such that the heating is convection and/or conduction heating. Insulation 212 may be arranged between the heater 35 and the housing 200. Exhaust gas enters the PM filter assembly 34 from an upstream inlet 214 and is heated by one or more zones of the PM filter assembly 34. The heated exhaust gas is received by the filter 202.

Figure 6:
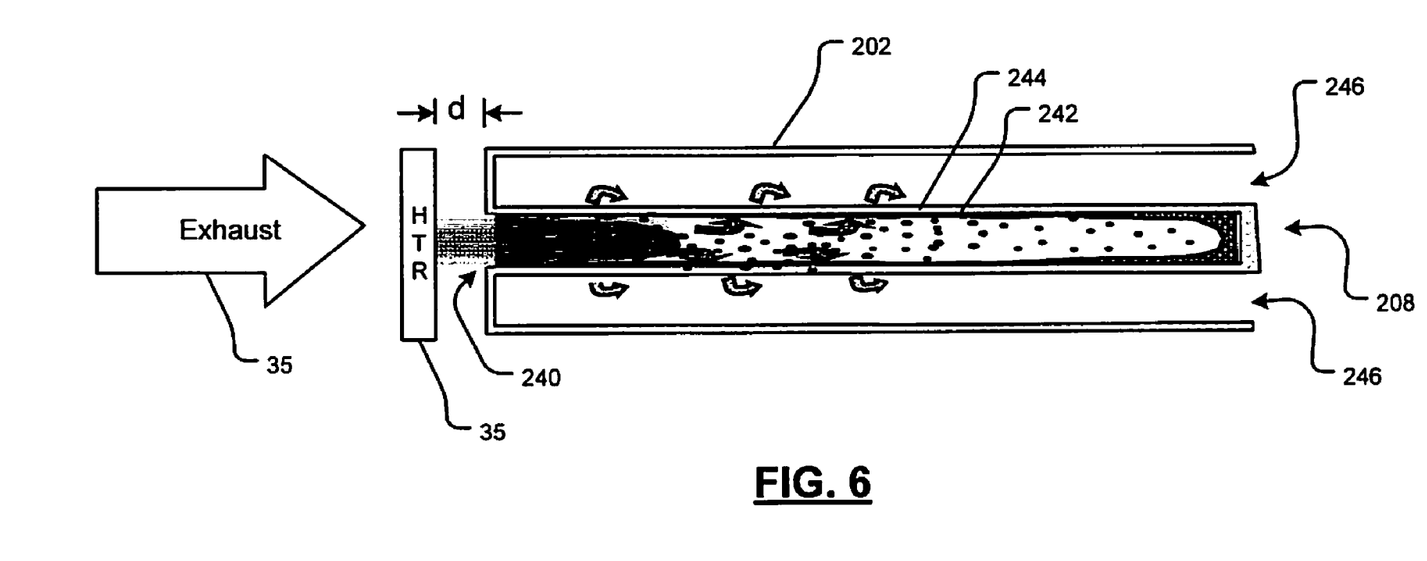
FIG. 6 illustrates heating within the zoned electric heater of FIGS. 1 and 5.

Referring now to FIG. 6, heating within the PM filter assembly 34 is shown in further detail. Exhaust gas 250 passes through the heater 35 and is heated by one or more zones of the heater 35. If spaced from the filter 202, the heated exhaust gas travels a distance "d" and is then received by the filter 202. For example only, the distance "d" may be ½" or less. The filter 202 may have a central inlet 240, a channel 242, filter material 244 and an outlet 246 located radially outside of the inlet. The filter may be catalyzed. The heated exhaust gas causes PM in the filter to burn, which regenerates the PM filter. The heater 35 transfers heat by convection and/or conduction to ignite a front portion of the filter 202. When the soot in the front face portions reaches a sufficiently high temperature, the heater is turned off. Combustion of soot then cascades down a filter channel 254 without requiring power to be maintained to the heater.

Figure 7:
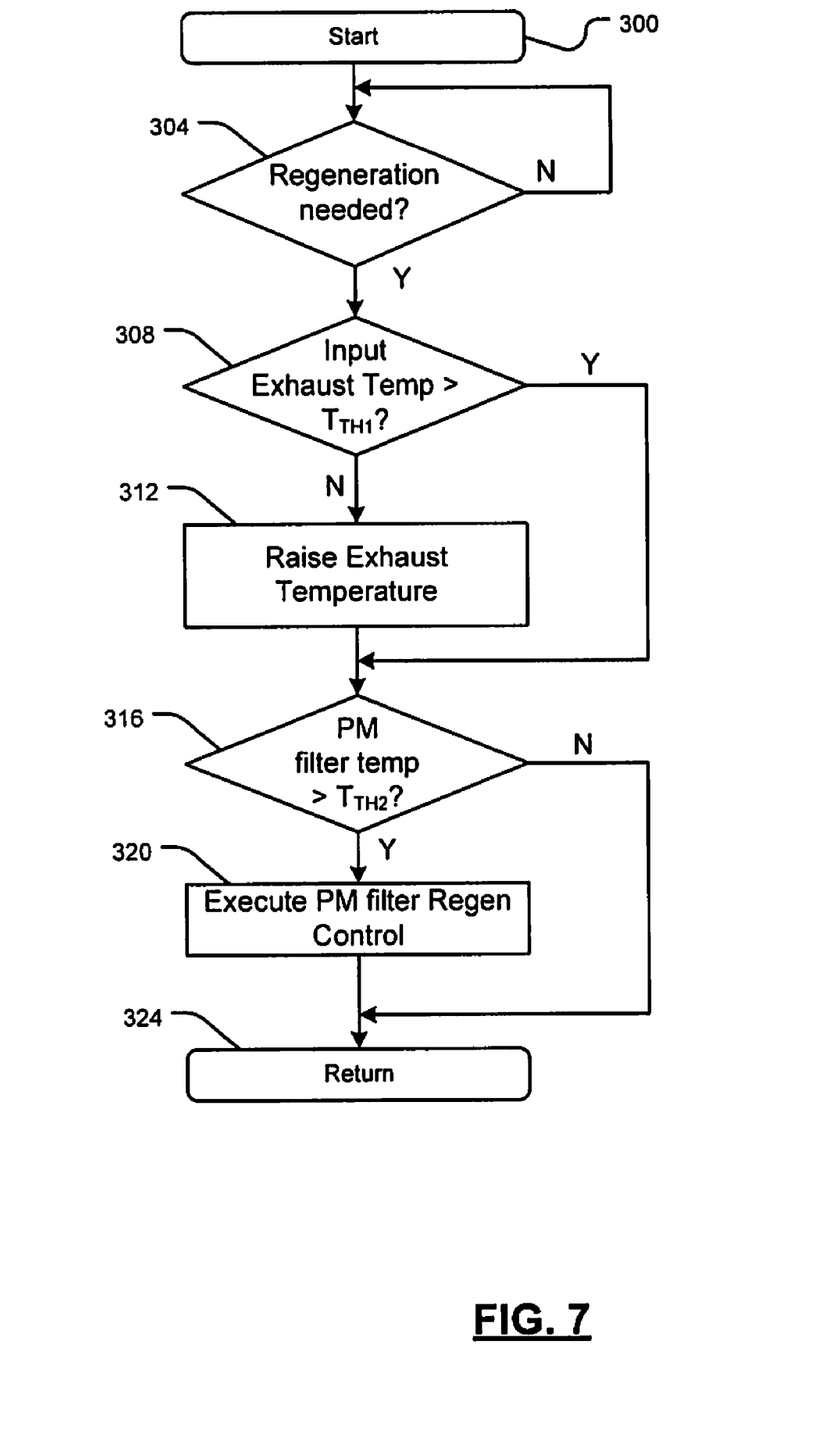
FIG. 7 is a flowchart illustrating exemplary steps performed by the control module to increase exhaust temperature input to the electrically heated PM filter before starting regeneration.

Referring now to FIG. 7, control begins in step 300. In step 304, control determines whether regeneration is needed. If step 308, control determines whether the input exhaust temperature to the PM filter is greater than a first temperature threshold $T_{TH1}$. The first temperature threshold $T_{TH1}$ may be greater than a normal exhaust gas temperature encountered during normal engine operation and less than soot oxidation temperatures. For example only, the first temperature threshold $T_{TH1}$ may be selected in the range between 340-540 degrees Celsius. For example only, the temperature threshold $T_{TH1}$ may be selected in the range between 390-490 degrees Celsius. For example only, the temperature threshold $T_{TH1}$ may be selected in the range between 430-470 degrees Celsius. For example only, the temperature threshold $T_{TH1}$ may be selected to be approximately 440-460 degrees Celsius. As used herein, the term "about" means +/−5 degrees Celsius.

If step 308 is false, the engine control module increases the exhaust temperature using any suitable approach in step 312. Control continues from steps 312 and 308 (if true) with step 316. If step 316 is true, control determines whether the PM filter temperature is greater than a second temperature threshold $T_{TH2}$. If step 316 is true, control executes PM filter regeneration control. Control continues from steps 316 (if false) and step 320 with step 324.

For example only, regeneration temperature in the PM filter may be set to approximately greater than or equal to 600 degrees Celsius. For example only, regeneration temperature in the PM filter may be set to approximately greater than or equal to 700 degrees Celsius. For example only, regeneration temperature in the PM filter may be set to approximately greater than or equal to 800 degrees Celsius. In one embodiment a target temperature is set at 900 degrees Celsius. Heater segment temperatures may be set at approximately equal to or greater than the above stated temperatures.

Figure 8:
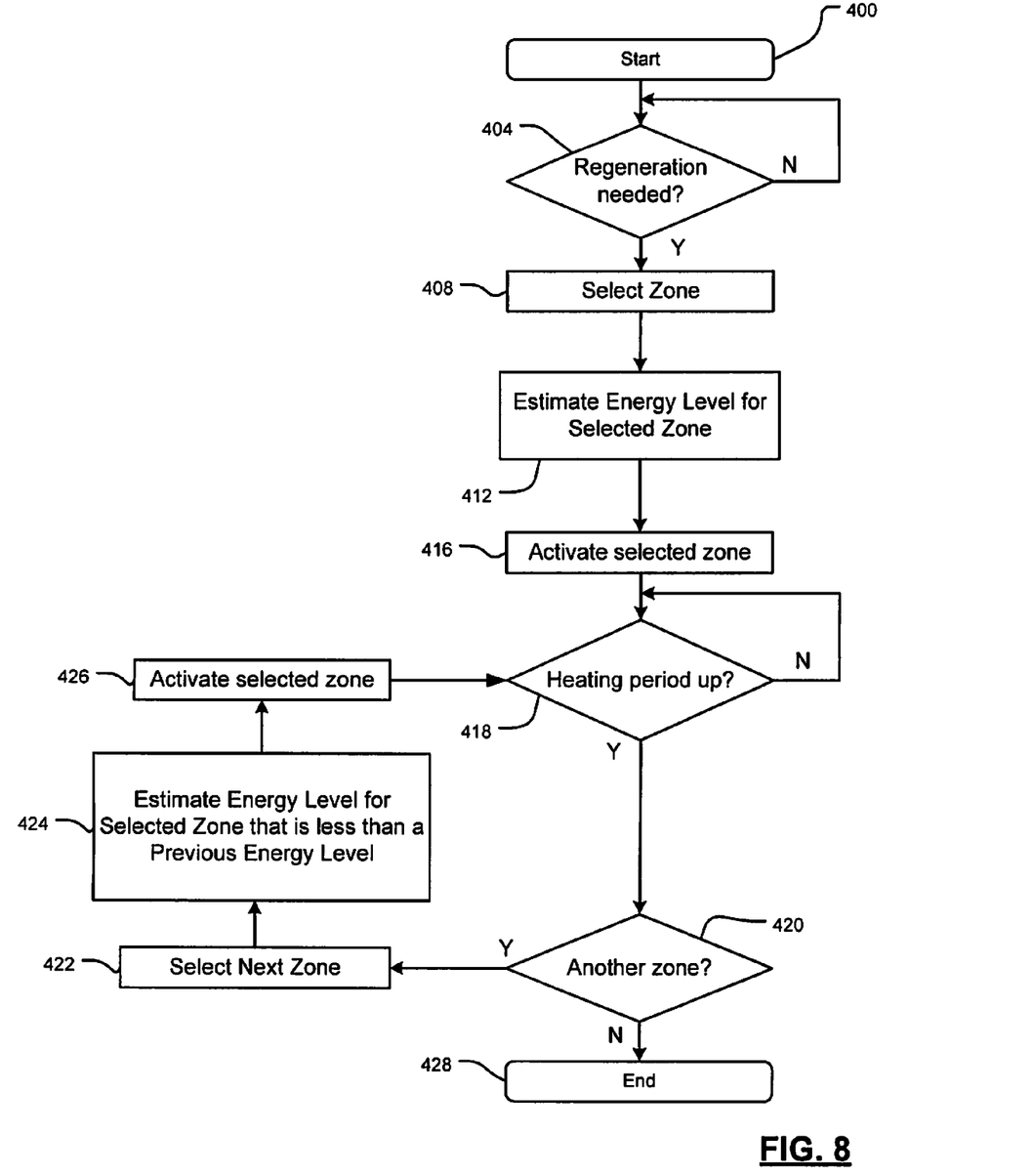
FIG. 8 is a flowchart illustrating exemplary steps for regenerating a zoned electric heater associated with a PM filter.

Referring now to FIG. 8, exemplary steps for regenerating a zoned PM filter are shown. In step 400, control begins and proceeds to step 404. If control determines that regeneration is needed in step 404, control selects one or more zones in step 408.

In step 412, control estimates energy sufficient to achieve a minimum filter face temperature. The estimated energy includes power and a heating period to apply a fixed or variable power level to the selected zone or to selected portions thereof. The estimated energy is based on at least one of power, including current and voltage, the predetermined period, exhaust flow and exhaust temperature. The estimated energy may also be based on the cross-sectional area associated with the heater segments, the number of zones, resistive characteristics associated with the zones, and other factors, some of which are described herein. The estimated energy level may be determined based on pressure drop across the PM filter from inlet to outlet, as is described below.

The variation in flow distribution across the zones may be used to estimate the energy level to be supplied. The minimum face temperature should be sufficient to start the soot burning and to create a cascading effect. For example only, the minimum face temperature may be set to 700 degrees Celsius or greater. The power may be determined based on the predetermined period or vice versa.

In step 416, control activates the heater for the selected zone based on the estimated energy and corresponding power and predetermined period for application of that power. The heater segments associated with the selected zone are activated. As an example, a first energy level having an associated first power level is applied to the heater segments for a first predetermined period of time (duration of applied power). For example, the control module 44 may signal the power switch module 47 to provide power to the heater segments. A pulse width modulated signal may be generated by the control module 44 and provided to the power switch module 47 and adjusted to provide the determined energy level.

In step 418, control determines whether the predetermined heating period is up. If step 418 is true, control determines whether additional zones need to be regenerated in step 420. If step 420 is true, control proceeds to step 422, otherwise control ends at step 428.

In step 422, control selects another zone for regeneration. In step 424, control estimates energy to apply to the heater segments associated with the selected zone of step 422. The estimated energy level may be determined similar to the process of step 412. The estimated energy level is less than the energy level applied to a previously activated zone and/or the first zone activated in step 416. To provide a decreased energy level, power or the duration that the power is applied may be decreased. Control accounts for the number of regenerated and non-regenerated zones when determining flow distribution. Thus, a second or subsequent power level may be applied that is less than a previous and/or the first power level. As an alternative or in combination with a decrease in power a second or subsequent predetermined time may be determined that is less than a previous and/or the first predetermined time. In step 426, control activates the selected zone of step 422 by applying a corresponding power level for a duration of time to provide the energy level determined in step 424.

The above-described steps are meant to be illustrative examples; the steps may be performed sequentially, synchronously, simultaneously, continuously, during overlapping time periods or in a different order depending upon the application.

Figure 9:
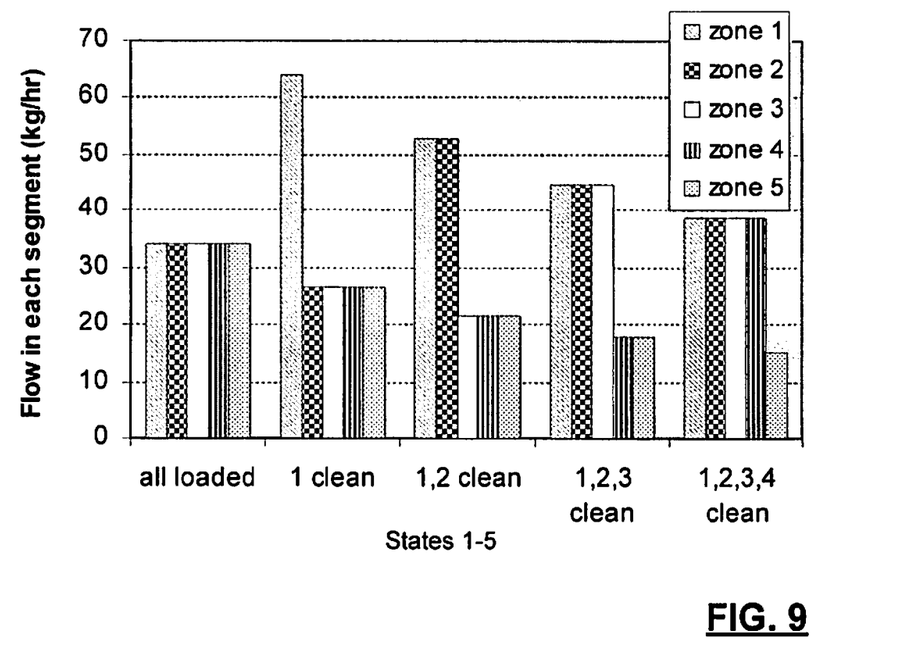
FIG. 9 is an example graph illustrating redistribution of flow during regeneration of a PM filter.

Referring now to FIG. 9, an example graph illustrating redistribution of flow during regeneration of a PM filter. The graph includes flow for each regenerative state during regeneration of a five (5) zones PM filter is shown. Five regenerative states are shown. For each of the five states five bars are shown. Each bar is associated with a particular zone of the PM filter.

The first state is associated with the PM filter prior to regeneration when the five zones are loaded or substantially loaded with soot. The second state is associated with when a first zone has been regenerated. Thus, the flow in the first zone increased, as shown. Since the flow in the first zone increases, the flow in the other zones decreases. The decrease in flow rate allows for application of a decreased energy level for regeneration of the non-regenerated zones. When a zone is regenerated, the lack of soot in that zone causes a drop in flow resistance leading to a higher flow. Zones that are generated later have the benefit of reduced flow, due to their high flow resistance caused by the soot buildup. Reduced flow helps to transfer energy from an electric heater to exhaust gas and to the PM filter.

The first zone regenerated may receive a maximum energy level and subsequent zones may receive a progressively less energy level. The distribution of energy and/or power may follow the distribution of flow.

The third state is associated with when the first and second zones have been regenerated. Thus, the flow in the first and second zones decreases while the flow in the third, fourth and fifth zones decreases, as shown. The fourth and fifth states have similar progressive results as that of the third state.

Figure 10:
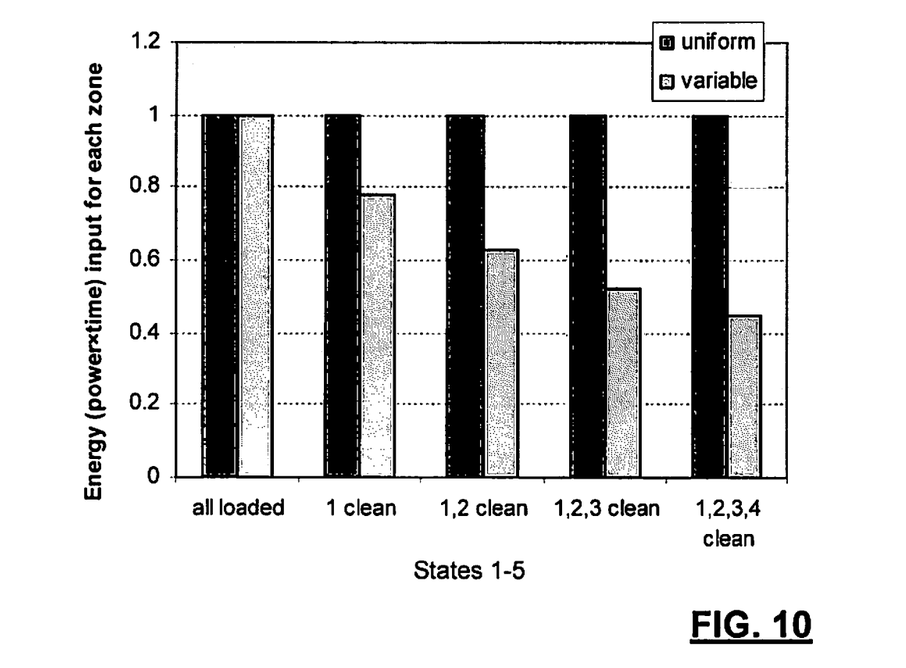
FIG. 10 is an example graph of energy input to each of the five zones of FIG. 9.

Referring now to FIG. 10, an example graph of energy input to each of the five zones of FIG. 9 is shown. The vertical axis is energy in percentage, where 100% corresponds to a maximum energy value. Five regenerative states are shown. For each of the five states two bars are shown. The first bar represents an example of when a uniform energy level is applied to each of the five zones. The second bar represents a progressively decreasing amount of energy that is applied to each of the five zones. The first state is associated with the PM filter prior to regeneration when the five zones are loaded or substantially loaded with soot. The second state is associated with when the first zone is regenerated. The third state is associated with when the second zone is regenerated. The fourth state is associated with when the third zone is regenerated. The fifth state is associated with when the fourth zone is regenerated.

The graphs of FIGS. 9 and 10 are examples of when the zones of a PM filter are modeled as separate linked PM filters, each of which having approximately equal soot loading. Energy levels may be adjusted to account for unequal amounts of soot loading. The pressure drop across a PM filter for clean and loaded zones can be represented as a function of various factors. Primary factors may include flow and soot loading.

For example, pressure drop of a clean PM filter may be represented as provided by equation [1]. The linear term represents the pressure losses due to channel flow and the Darcy's term for flow through a soot layer and a PM filter wall. The quadratic term represents the losses due to expansion and contraction at PM filter inlet and exit of the PM filter, and the $2^{nd}$ order inertial losses through the wall.

$$\Delta P = \frac{\mu Q_g}{2V_{eff}}(D+w_0)^2 \left[\frac{w_0}{K_0 D} + \frac{8FL_{eff}^2}{3D^4}\right] + \frac{\rho_g Q_g^2}{V_{eff}^2 D^2}(D+w_0)^4 \left[\frac{2\zeta L_{eff}^2}{D^2} + \frac{\beta w_0}{4}\right] \quad [1]$$

Also provided as an example, pressure drop across a PM filter loaded with soot (cake layer) is provided by equation [2].

$$\Delta P = \frac{\mu Q_g}{2V_{eff}} (D+w_0)^2 \left[\frac{w_0}{K'_0 D} + \frac{1}{2K_s}\ln\left(\frac{D}{D-2w}\right) + \frac{4FL_{eff}^2}{3}\left(\frac{1}{(D-2w)^4} + \frac{1}{D^4}\right)\right] + \frac{\rho_g Q_g^2}{V_{eff}^2 D^2}(D+w_0)^4 \left[\frac{2\zeta L_{eff}^2}{D^2} + \frac{\beta w_0}{4}\right] \quad [2]$$

Nomenclature

| | | |
|---|---|---|
| D | Channel width (hydraulic diameter) | m |
| F | Friction factor for square channels, 28.45 | — |
| $K_0$ | Clean wall permeability of PM filter | $m^2$ |
| $K'_0$ | Soot loaded wall permeability of PM filter | $m^2$ |
| $K_s$ | Permeability of soot layer | $m^2$ |
| $L_{eff}$ | Effective length (without plugs) of PM filter channel | m |
| $P_{atm}$ | Atmospheric pressure | $N/m^2$ |
| $Q_g$ | Inlet gas flow to the PM filter | $m^3/s$ |
| $V_{eff}$ | Effective volume of PM filter | m |
| $w_0$ | Wall thickness | m |
| w | Soot layer thickness | m |
| $\beta$ | Forchheimer's coefficient for porous wall | $m^{-1}$ |
| $\zeta$ | Expansion-contraction coefficient for inertial pressure loss | — |
| $\mu$ | Gas phase viscosity | kg/m/s |
| $\rho_g$ | Gas density | $kg/m^3$ |

It may be assumed that the zones of the PM filter have the approximately the same pressure drop. Thus, the flow adjusts such that the pressure drop through a clean section is the same as the pressure drop across a loaded section. Equations 1 and 2 may be used to calculate flow, as the zones are regenerated. Control may also account for temperature differences between the zones.

To calculate the energy to apply to the zones, it may be assumed that the electric heater and/or heater segments are in steady state. The total energy put into the electric heater is proportional to the total energy transferred to the gas phase. Thus, energy is approximately equal to a constant multiplied by the flow rate further multiplied by the exhaust gas temperature. With increased flow rate, more energy is provided to the electric heater to heat up the exhaust gas to a predetermined temperature. Conversely, when flow rate decreases, due to there being another preferential pathway for the exhaust gas, namely the cleaned section, a decreased amount of energy is provided to heat up the exhaust gas to the same predetermined temperature.

The above-described embodiments reduce the amount of power drawn from a power source, such as a battery, during regeneration of a PM filter. The embodiments reduce power consumption of an electric heater used to regenerate a PM filter. The embodiments also improve substrate/PM filter durability as each zone of the PM filter receives the appropriate amount of energy for regeneration.

The present disclosure tends to improve regeneration of PM filters. The approach described herein tends to reduce thermal delta and therefore improves substrate durability. Force due to thermal expansion and contraction is defined as $\alpha \Delta TE(Area)$ where $\alpha$ is a coefficient of expansion, E is Young's Modulus, Area is perimeter area and is equal to $\Pi D$, and $\Delta T$ is the temperature delta. As can be appreciated, increasing exhaust gas temperature before using the electrical heaters reduces $\Delta T$, which reduces force due to thermal expansion and contraction. The present disclosure also tends to provide more consistent heating patterns and to reduce flameout.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A system comprising:
    a particulate matter (PM) filter that includes a plurality of zones including groups of zones, wherein each of said groups of zones is arranged in a respective one of a plurality of circumferential bands;
    an electrical heater that includes a plurality of heater segments, which each correspond with a respective one of said plurality of zones,
    wherein said electrical heater is arranged upstream from and proximate with said PM filter; and
    a control module configured to regenerate said plurality of zones by selectively applying a different energy level to each of said zones via said electrical heater,
    wherein said control module is configured to determine each of said different energy levels based on an exhaust flow rate of exhaust gas passing through a respective one of said plurality of zones.

2. The system of claim 1 wherein said control module is configured to estimate a temperature of one of said plurality of heater segments based on at least one of said exhaust flow rate, an exhaust temperature, and an amount of power supplied to said one of said plurality of heater segments, and
    wherein said control module is configured to adjust at least one of said amount of power applied to said one of said plurality of heater segments and a duration that one of said different energy levels is applied based on said heater segment temperature.

3. The system of claim 1 further comprising pressure sensors that detect pressures within said PM filter,
    wherein said control module is configured to determine said exhaust flow rates of said plurality of zones based on said pressures within said PM filter.

4. A system comprising:
    a particulate matter (PM) filter that comprises a plurality of zones including a first group of zones and other groups of zones, wherein each of said first group of zones and said other groups of zones are arranged in circumferential bands;
    an electrical heater that includes a plurality of heater segments, which each correspond with a respective one of said plurality of zones,
    wherein said electrical heater is arranged upstream from and proximate with said PM filter; and
    a control module configured to selectively apply a first energy level to said first group of zones via a first one of said plurality of heater segments when initiating regeneration of said PM filter in said first group of zones,
    wherein said control module is configured to selectively apply a plurality of energy levels that are less than said first energy level to said other groups of zones via respective ones of said plurality of heater segments to initiate regeneration in said other groups of zones, and
    wherein said control module is configured to progressively decrease said plurality of energy levels applied to said other groups of zones such that each subsequently activated group of said plurality of zones receives a respectively lower energy level than previously activated groups of said plurality of zones during said regeneration of said PM filter.

5. The system of claim 4 wherein said electrical heater is one of adjacent to and in contact with said PM filter.

6. The system of claim 4 wherein said control module is configured to selectively apply a first power level to said first one of said plurality of heater segments, and
    wherein said control module is configured to selectively apply a plurality of power levels that are less than said first power level to said plurality of heater segments associated with said other groups of zones.

7. The system of claim 4 wherein said control module is configured to selectively apply a first power level to said first one of said plurality of heater segments for a first duration of time, and
    wherein said control module is configured to selectively apply a second power level to a second heater segment for a second duration of time, and
    wherein said second duration of time is different than said first duration of time.

8. The system of claim 7 wherein said control module is configured to estimate a temperature of one of said heater segments based on an exhaust flow rate, an exhaust temperature, and an amount of power supplied to said one of said heater segments, and
    wherein said control module is configured to adjust an energy level applied to said one of said heater segments based on said temperature of said one of said heater segments.

9. The system of claim 4 further comprising:
    a power source; and
    a power switch module that is electrically coupled between said power source and said electrical heater,
    wherein said control module is configured to select one of said plurality of heater segments via said power switch module.

10. The system of claim 9 wherein:
    said control module is configured to generate a pulse width modulated signal;
    said power switch module provides power to said electrical heater based on said pulse width modulated signal;
    said control module is configured to generate a first pulse width modulated signal for said first one of said plurality of heater segments; and
    said control module is configured to generate a second pulse width modulated signal for a second one of said plurality of heater segments.

11. The system of claim 4, wherein said control module is configured to determine each of said plurality of energy levels based on an exhaust flow rate of exhaust gas passing through a respective one of said plurality of zones and a temperature of said exhaust gas.

12. The system of claim 4, wherein each of said first group of zones and said other groups of zones includes a zone in at least two of said circumferential bands.

13. The system of claim 4, wherein said circumferential bands are arranged across an inlet of said PM filter.

14. The system of claim 4, wherein said control module is configured to select one of said circumferential bands and activates zones in said selected one of said circumferential bands.

15. The system of claim 4, wherein each of said heater segments extends over an inlet of a respective one of said plurality of zones to heat exhaust gas entering said respective one of said plurality of zones and not exhaust gas entering zones adjacent to said respective one of said plurality of zones.

16. The system of claim 4, wherein:
each of said heater segments comprises a first end and a second end;
said first end extends over a peripheral edge of a respective one of said plurality of zones; and
said second end extends over said peripheral edge.

17. The system of claim 4, wherein:
two or more of said plurality of heater segments are associated with one of said plurality of zones;
said two or more heater segments include an inner heater segment and an outer heater segment; and
wherein said outer heater segment extends around said inner heater segment in an area over said one of said plurality of zones.

18. The system of claim 4, wherein said circumferential bands are concentric rings.

19. A method comprising:
providing a particulate matter (PM) filter that comprises a plurality of zones including a first zone and other zones, wherein each of said plurality of zones are arranged in circumferential bands;
arranging an electrical heater that includes a plurality of heater segments, which each correspond with a respective one of said plurality of zones, upstream from and proximate with said PM filter;
selectively applying a first energy level to said first zone via a first one of said plurality of heater segments when initiating regeneration in said first zone; and
selectively applying a plurality of energy levels that are less than said first energy level to said other zones via said plurality of heater segments to initiate regeneration in said other zones.

20. The method of claim 19 comprising:
selectively applying a first power level to said first one of said plurality of heater segments; and
selectively applying a plurality of power levels that are less than said first power level to said heater segments associated with said other zones.

21. The method of claim 19 comprising:
selectively applying a first power level to said first one of said plurality of heater segments for a first duration of time; and
selectively applying a second power level to a second one of said plurality of heater segments for a second duration of time,
wherein said second duration of time is different than said first duration of time.

22. The method of claim 21 further comprising:
estimating a temperature of one of said heater segments based on at least one of an exhaust flow rate, an exhaust temperature, and an amount of power supplied to said one of said heater segments, and
adjusting at least one of said amount of power applied to said one of said heater segments and a duration that an energy level is applied to said one of said heater segments based on said temperature of said one of said heater segments.

23. The method of claim 19, wherein said selectively applying of said plurality of energy levels comprises progressively decreasing said plurality of energy levels applied to said other zones such that each subsequently activated one of said plurality of zones receives a respectively lower energy level than previously activated ones of said plurality of zones during said regeneration of said PM filter.

\* \* \* \* \*